United States Patent [19]
Mocek et al.

[11] Patent Number: 5,842,209
[45] Date of Patent: Nov. 24, 1998

[54] USER INTERFACE FOR VISUALLY DEPICTING INNER/OUTER/LEFT/RIGHT JOINS IN A DATABASE SYSTEM

[75] Inventors: Darryl Jon Mocek, San Jose; Kester Li; Jonathan Michael Levine, both of San Francisco, all of Calif.

[73] Assignee: International Business Machines Corporation, Armonk, N.Y.

[21] Appl. No.: 707,140

[22] Filed: Sep. 3, 1996

[51] Int. Cl.$^6$ .................................................. G06F 17/30
[52] U.S. Cl. ............................ 707/4; 707/1; 707/2; 707/3
[58] Field of Search ......................... 707/1–10, 100–209, 707/2, 3, 4, 101, 200

[56] References Cited

U.S. PATENT DOCUMENTS

| | | | |
|---|---|---|---|
| 5,157,783 | 10/1992 | Anderson et al. | 707/4 |
| 5,197,005 | 3/1993 | Schwartz et al. | 707/2 |
| 5,237,502 | 8/1993 | White et al. | 704/1 |
| 5,265,014 | 11/1993 | Haddock et al. | 704/9 |
| 5,386,556 | 1/1995 | Hedin et al. | 704/4 |
| 5,412,804 | 5/1995 | Krishna | 707/2 |
| 5,446,842 | 8/1995 | Schaeffer et al. | 395/200.35 |
| 5,471,611 | 11/1995 | McGregor | 704/4 |
| 5,519,862 | 5/1996 | Schaeffer et al. | 395/701 |
| 5,548,755 | 8/1996 | Leung | 707/2 |
| 5,555,367 | 9/1996 | Premerlani | 707/4 |
| 5,557,791 | 9/1996 | Cheng | 707/2 |
| 5,583,982 | 12/1996 | Matheny et al. | 345/326 |
| 5,584,024 | 12/1996 | Shwartz | 704/4 |
| 5,615,367 | 3/1997 | Bennett | 707/102 |
| 5,623,591 | 4/1997 | Cseri | 345/326 |
| 5,680,603 | 10/1997 | Bhargava | 1/1 |

*Primary Examiner*—Thomas G. Black
*Assistant Examiner*—Diane D. Mizrahi
*Attorney, Agent, or Firm*—Merchant, Gould, Smith, Edell, Welter & Schmidt

[57] ABSTRACT

A method, apparatus, and article of manufacture which provides for visually depicting join relationships in a database management system. The method comprises the steps of visually depicting join relationships on a monitor coupled to a computer and receiving a join command from a user input device into the computer, wherein the join command selectively chooses a join relationship. The join relationships are visually depicted in a window displaying matching records in a first table joined to matching records in a second table, all records in a first table joined to matching records in a second table, and matching records in a first table joined to all records in a second table.

21 Claims, 16 Drawing Sheets

USER INTERFACE FOR VISUALLY DEPICTING INNER/OUTER/LEFT/RIGHT JOINS IN A DATABASE SYSTEM

CROSS REFERENCE TO RELATED APPLICATION

This application is related to the following co-pending and commonly-assigned patent applications:

Pending application Ser. No. 08/708,117, entitled "FIND ASSISTANT FOR CREATING DATABASE QUERIES," filed on same date herewith, by Michael R. Hibbetts et al., and application Ser. No. 08/707,139, entitled "NATURAL LANGUAGE TRANSLATION OF AN SQL QUERY," filed on same date herewith, by Darryl J. Mocek et al., both of which applications are incorporated by reference herein.

BACKGROUND OF THE INVENTION

1. Field of the Invention

This invention relates generally to methods of accessing information stored in a database management system (DBMS), and in particular to a method for visually depicting join relationships in a DBMS.

2. Description of Related Art

Large-scale integrated database management systems provide an efficient, consistent, and secure means for storing and retrieving vast amounts of data. This ability to manage massive amounts of information is a virtual necessity in business today.

Relational Database Management Systems (RDBMS) software using Structured Query Language (SQL) interfaces are well known in the art. The SQL interface has evolved into a standard language for RDBMS software and has been adopted as such by both the American National Standards Institute (ANSI) and the International Standards Organization (ISO).

In RDBMS software, all data is externally structured into tables. The SQL interface allows users to formulate relational operations on the tables either interactively, in batch files, or embedded in host languages such as C, COBOL, etc. Operators are provided in SQL that allow the user to manipulate the data, wherein each operator operates on either one or two tables and produces a new table as a result. The power of SQL lies on its ability to link information from multiple tables or views together to perform complex sets of procedures with a single statement.

Unfortunately, while powerful, the SQL interface can be difficult to use, especially for laypersons with little or no experience with databases or computers. This problem limits the application of RDBMS technology to provide business information, often to those who need it the most. Potential RDBMS users often fail to avail themselves to the benefits of RDBMS technology because they are either intimidated by or reluctant to learn new technology. Even if they are willing to learn, expensive and lengthy training may be required before these potential users achieve a basic functional capability. SQL's idiosyncrasies also have other negative consequences. For example, both novice and experienced SQL users often formulate improper SQL commands, and obtain search results which fail to disclose critical data or require the DBMS to search through more data than is required, lengthening the search, and placing unnecessary demands on DBMS processing.

This problem is especially onerous when retrieving data where no records or all records match, and inner or outer left/right table joins are required to perform the SQL search. Existing database management system user interfaces do not provide an integrated visual depiction of these table join operations to the user, leading to possible data retrieval errors.

SUMMARY OF THE INVENTION

To overcome the limitations in the prior art described above, and to overcome other limitations that will become apparent upon reading and understanding the present specification, the present invention discloses a method, apparatus, and article of manufacture for visually depicting join relationships in a database management system. The method comprises the steps of visually depicting join relationships on a display device coupled to a computer and receiving a join command from a user input device into the computer, wherein the join command selectively chooses a join relationship.

In an exemplary embodiment presented herein, the join relationships are selected from a window displaying matching records in a first table joined to matching records in a second table, all records in a first table joined to matching records in a second table, and matching records in a first table joined to all records in a second table.

The present invention also provides full SQL functionality by allowing the user to construct search strings with logical relationships between search parameters and to create complex SQL commands by linking simpler SQL commands with logical conditional operators.

Various advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples in accordance with the invention.

BRIEF DESCRIPTION OF THE DRAWINGS

Referring now to the drawings in which like reference numbers represent corresponding parts throughout.

DETAILED DESCRIPTION OF THE PREFERRED EMBODIMENT

Figure 1:
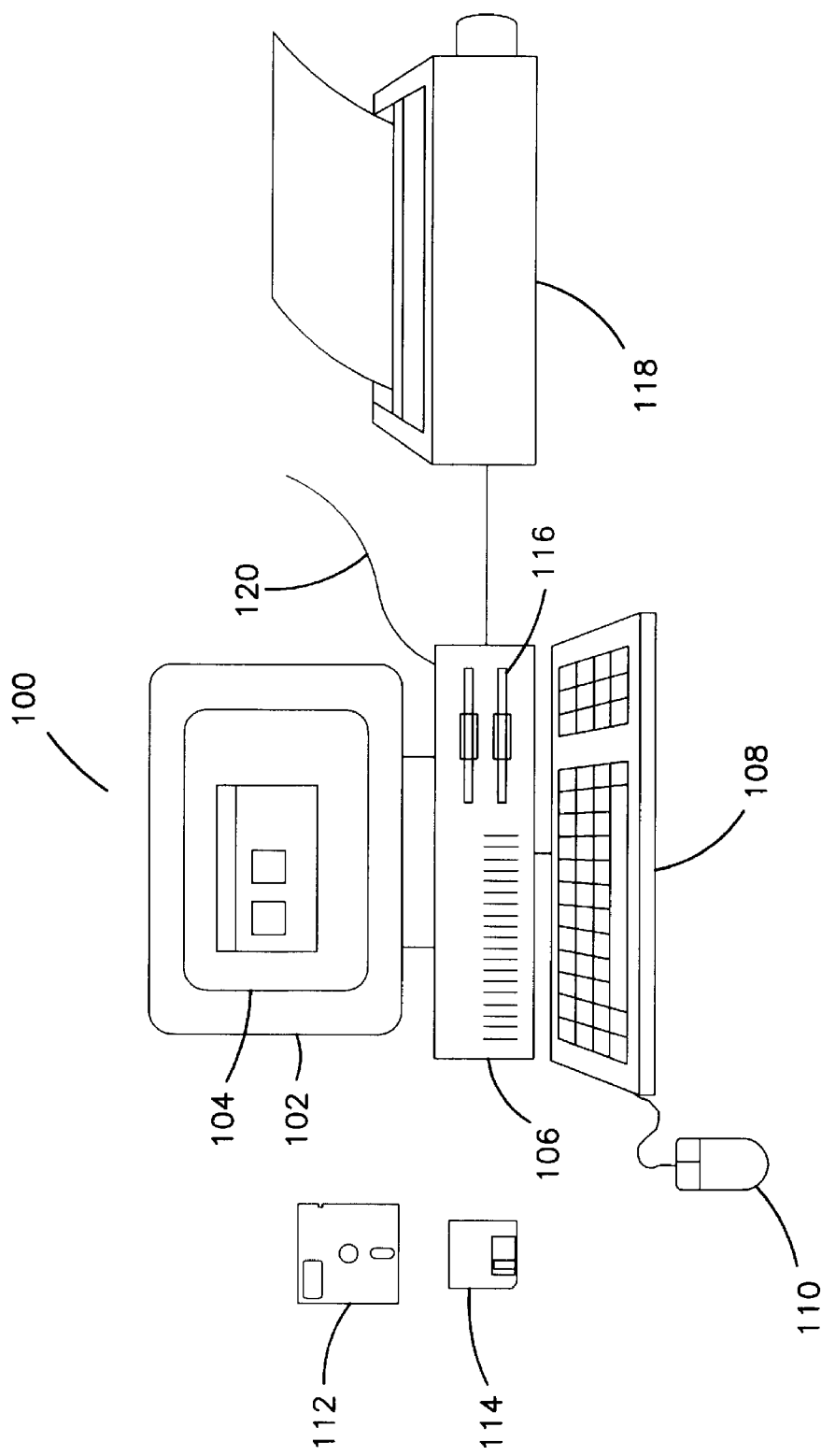
FIGS. 1–2 are diagrams illustrating an exemplary computer hardware environment that could be used with the present invention.
Figure 2:
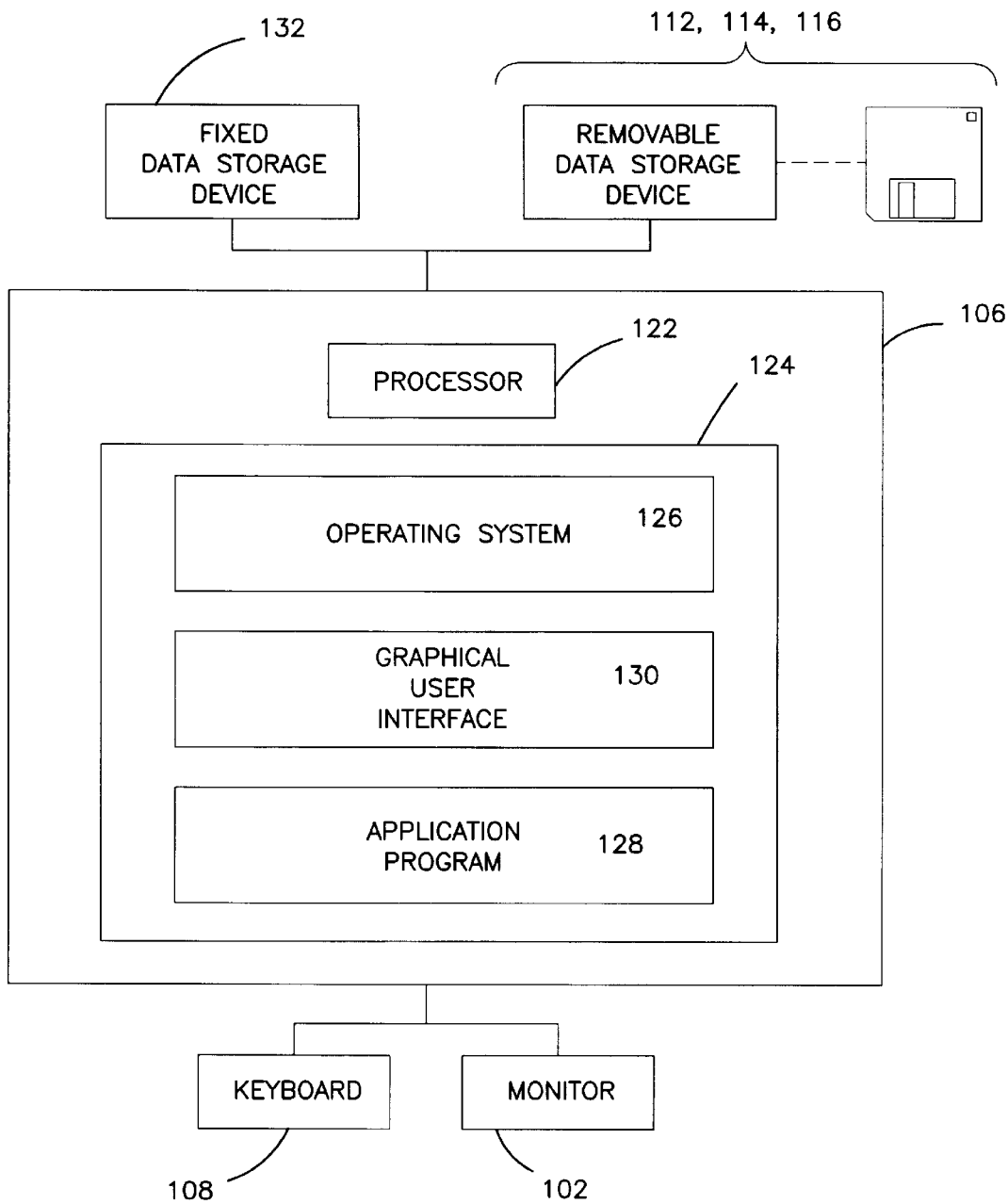

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.
Hardware Environment FIGS. 1 and 2 illustrate an exemplary computer hardware environment that could be used with the present invention. In the exemplary environment, a computer system 100 comprises a computer 106 coupled to I/O devices, such as a monitor 102, a keyboard 108, a mouse device 110, a removable disk 112 or 114 and associated drive 116, a CDROM device (not shown), audio speakers (not shown), and a printer 118. The computer 106 could also be coupled to other I/O devices, including a local area network (LAN) or wide area network (WAN) via interface cable 120. The monitor 102 presents a display 104 visually depicting information from the computer system 100 to the user.

The computer 106 generally includes a processor 122, random access memory (RAM) 124, and/or other components. The computer 106 operates under control of an operating system 126, such as Windows™, OS/2™, Macintosh™, AIX™, UNIX™, DOS™, Windows 95™, Windows NT™ etc. The present invention is preferably implemented by one or more application programs 128 that interact with the user via a graphical user interface 130 under the control of the operating system 126.

Generally, the operating system 126, application programs 128, and graphical user interface 130 are tangibly embodied in a computer-readable medium, e.g. one or more of removable data storage devices 112, 114 and 116, or fixed data storage devices 132, such as a hard drive. Also, the relational databases used with the present invention can be stored in data storage devices 112, 114, 116, and 132, or may be stored on a network or attached system accessed via interface cable 120.

Those skilled in the art will recognize that the exemplary environment illustrated in FIGS. 1 and 2 is not intended to limit the present invention. Indeed, those skilled in the art will recognize that other alternative hardware environments may be used without departing from the scope of the present invention.

User Operation

The operation of the present invention is described with reference to FIGS. 3A–3L, which illustrate exemplary embodiments of the user interface aspects of the present invention.

The present invention provides the user with the capability to define a database command SELECT statement before the records are retrieved, thus decreasing the time required to access and retrieve the records. The operation of the present invention is described as follows.

Tables Tab Window

Figure 3A:
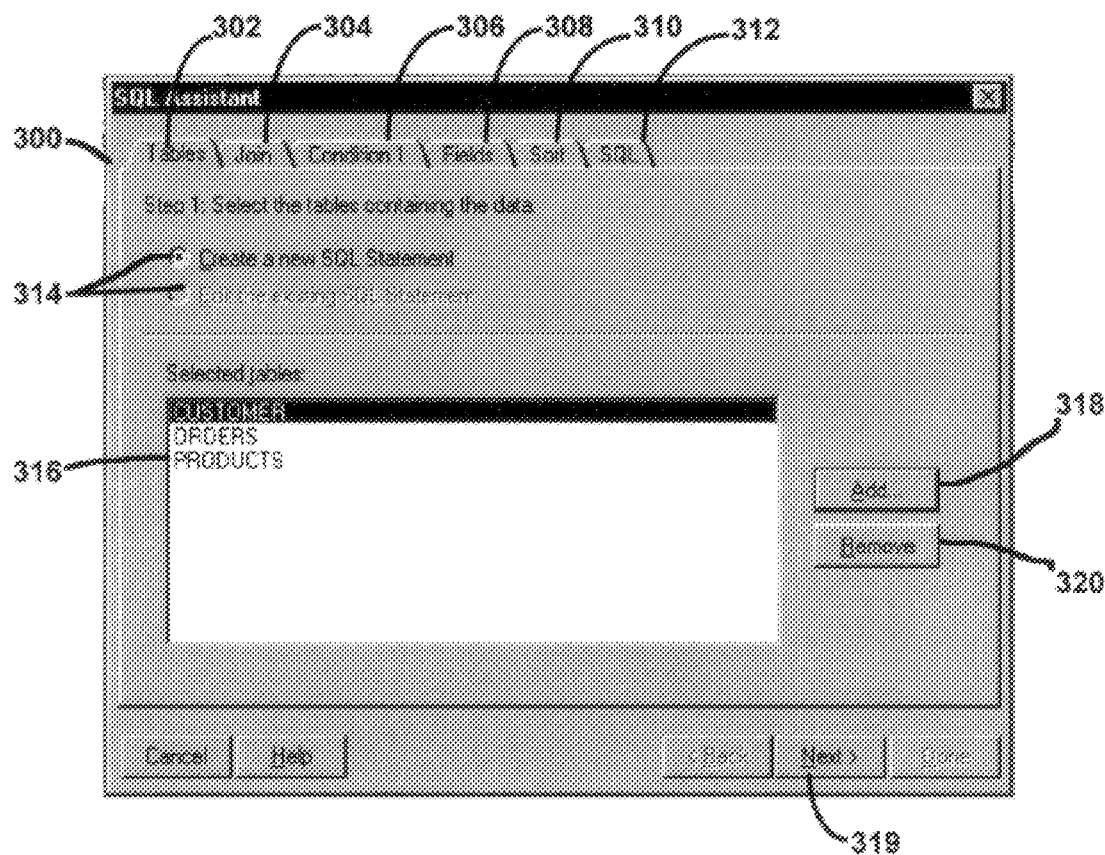
FIGS. 3A–3L are diagrams illustrating exemplary embodiments of the user interface provided by the present invention.
Figure 3B:
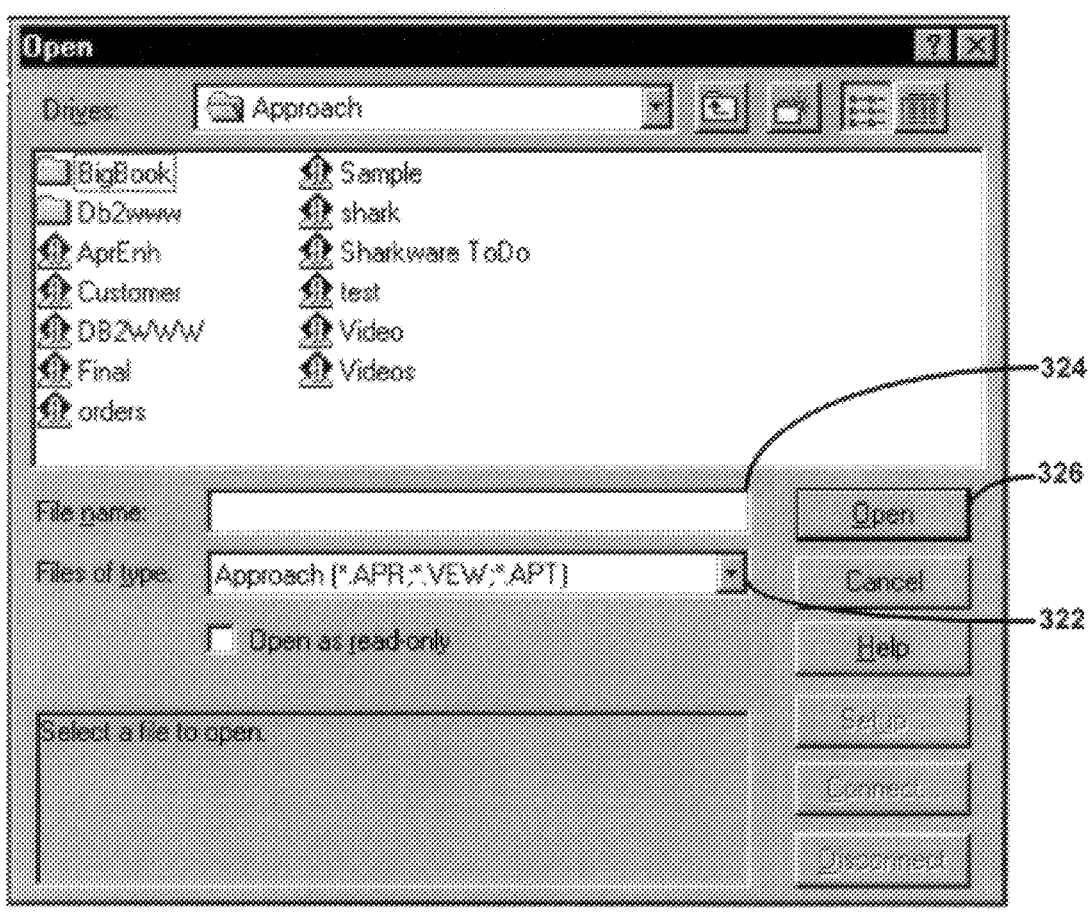

FIG. 3A presents a diagram of an exemplary embodiment of the user-interface of the present invention. The user interface comprises a table tab window 300 presented on the display 104 of the computer system 100, which includes a plurality of tabs 302–312 used to navigate the user interface. The information shown in FIG. 3A is displayed when the user selects the tables tab 302. This provides a list of the database tables the user has currently selected for use in the selected tables box 316. First, the user must indicate whether a new SQL statement is being created or the user wishes to edit an existing SQL statement by selecting from radio buttons 314. The user can then remove tables selected in the selected tables box 316 by pressing the remove button 320, or add tables by pressing the add button 318. If the user selects the add button 318, a standard Windows™ "Open Dialog" window will appear. This is shown in FIG. 3B. The user can choose to display different file types by selecting the files of type button 322. Using standard Windows™ techniques, the user may also browse through the directory and table listings and select database tables for opening. The user can select multiple SQL tables, but may only select one table at a time for non-SQL tables. If the user has chosen a non-SQL table, the add button 318 becomes gray, indicating that join operations cannot be performed across these tables.

When the user has completed making database table selections, the OK button 326 is selected, and the selected database table will appear in the selected tables listbox 316 depicted in FIG. 3A. The user can then choose one or more tables in the selected tables listbox 316 and click on the remove button 320 to remove database tables from the selected tables listbox 316.

At any time in the definition of the SQL statement, the user can remove a database table listed in the selected tables listbox 316 by clicking on the database table to be removed and selecting the remove button 320. If the user attempts to remove a table after having created a partial or full SQL statement, a dialog box will appear on the display 104 warning the user that the current SQL statement will be lost, and the user will be forced to begin again. If this happens, entries in all of the tab windows 302–312 will be deleted. The user can select the next button 319 or any of tab buttons 302–312 to proceed.

Join Tab Window

Figure 3C:
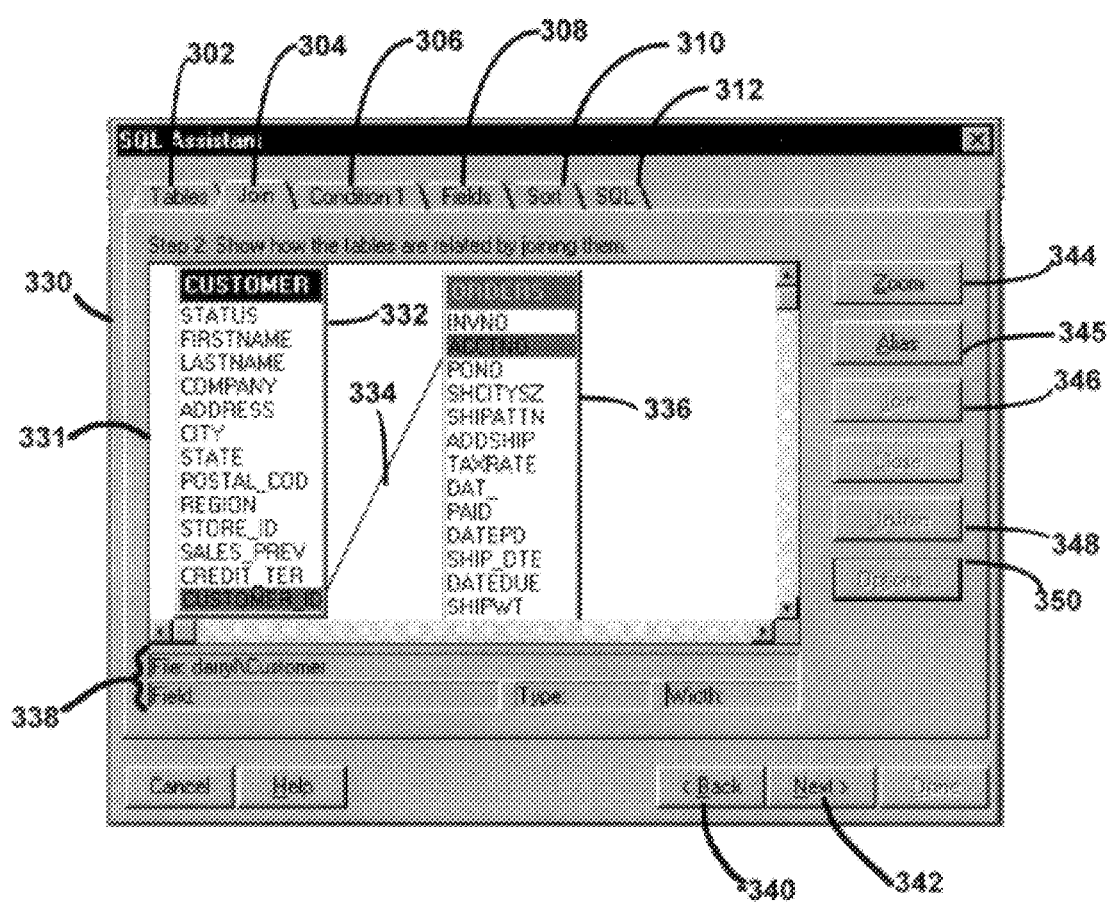

FIG. 3C shows the join tab window of the present invention. The join tab window 330 displays all of the database tables selected by the user using the tables tab window depicted and described with reference to FIG. 3A. The join tab window 330 comprises a join window display box 331, table information boxes 338 which display the file, field, field type, and field width of the currently chosen database field. Join button 346 is initially disabled, and becomes enabled when the user selects two fields in different tables in the join window display box 331. Once selected fields have been joined, as indicated by a join line 334 displayed in the join window display box 331, join button 346 becomes disabled until the user selects additional fields. Alternatively, joins may be created by dragging a field, such as the "CUSTOMER$_{ID}$" field depicted in the "CUSTOMER" table 332 from one of the tables, and dropping it in another table, such as the "ORDERS" table 336. The unjoin button 348 is initially disabled until the user selects a joint relationship between two database tables by selecting the join line 334 between the database tables 332 and 336. If the user selects the unjoin button 348, the join between the two selected database tables is removed. Alias button 345 allows user definition of specified data field or table relationships.

Relational Operations Dialog Box

Figure 3D:
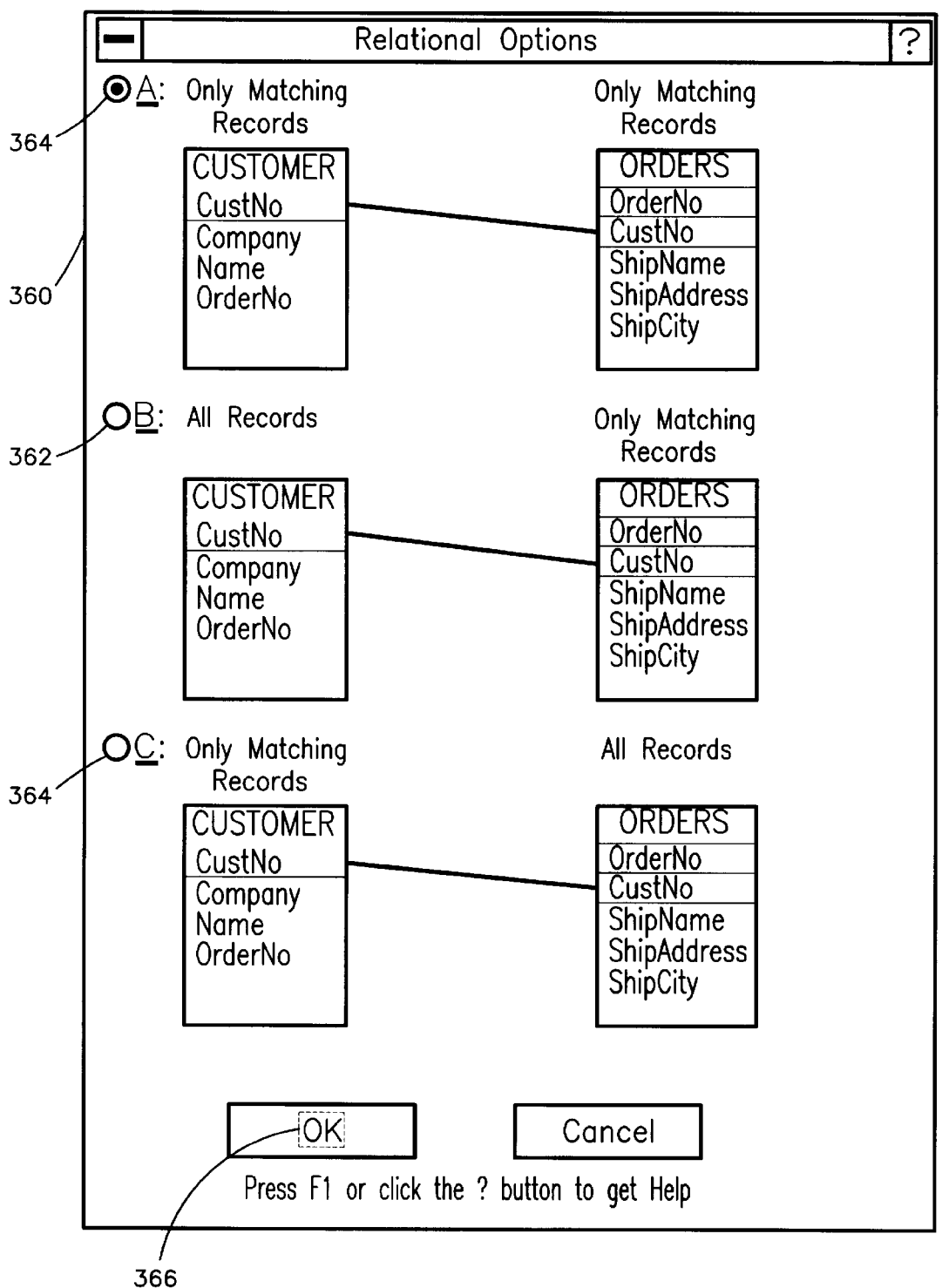

FIG. 3D presents an illustration of the relational operations dialog box 360 of the present invention. This dialog box appears on the display 104 when the user selects the options button 350 of the join tab window 330. By default the Inner Join (Only Matching Records—Only Matching Records) 364 radio button is selected. The user can also select the Left Outer Join (All Records—Only Matching Records) 362 radio button or Right Outer Join (Only Matching Records—All Records) 365 radio button as options. The graphic picture of the Inner Join 364, Left Outer Join 362, and Right Outer Join 365 includes the tables that the user selected and the fields that they joined from the join display box 331. When this process is completed, the user selects the relational options OK button 366, which in turn causes the join window display box 331 to be presented on the display 104.

Condition Tab Window

Figure 3E:
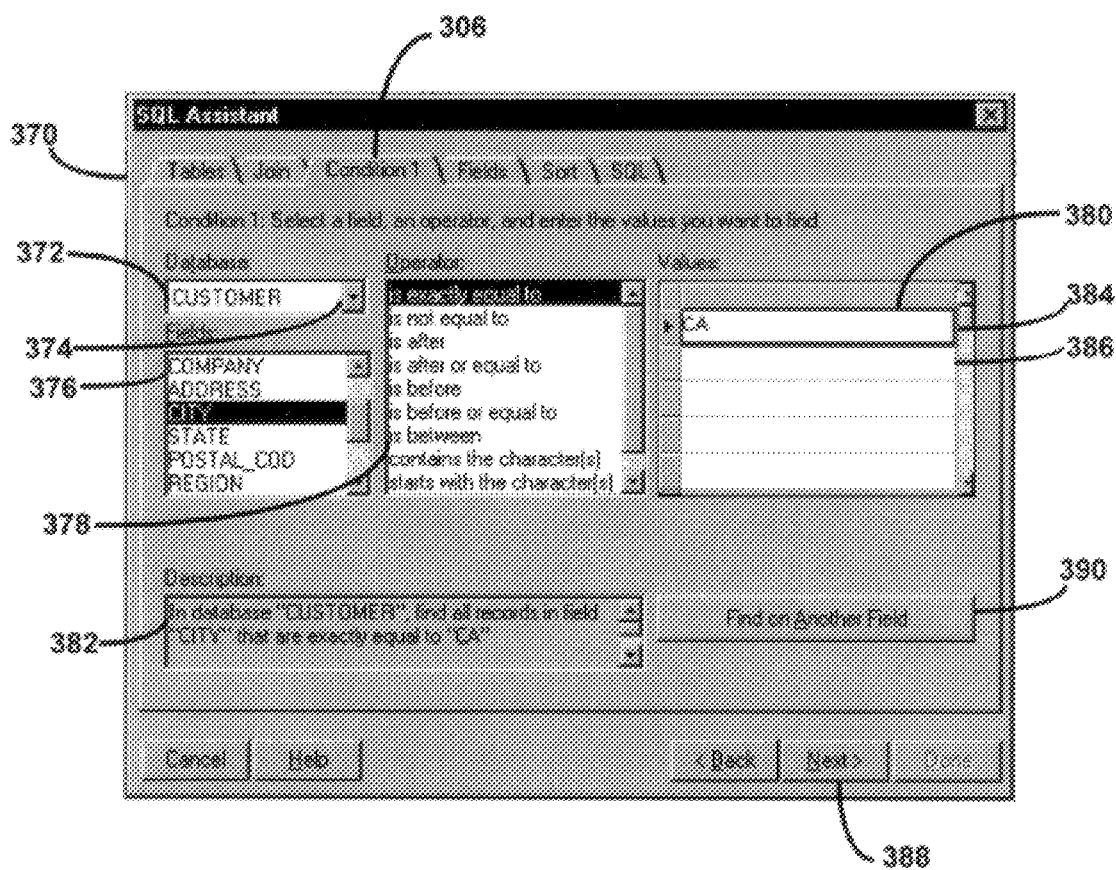

FIG. 3E presents the condition tab window 370 of the present invention. The condition tab window 370 is presented on the display 104 when the user selects the condition tab 306. The condition tab window 370 comprises a database table dropdown listbox 372 controlled by selecting a database table dropdown listbox tab 374, an associated field listbox 376, which displays the fields in the selected database table, a relational condition listbox 378, a search string edit box 380, and a natural language translation listbox 382. The user creates the search portion of an SQL statement (that portion following the WHERE clause) by selecting a table from the database table dropdown listbox 372. This is accomplished by selecting the database table dropdown listbox tab 374. The user also selects an associated database field from those available listed in the associated field listbox 376, and a relational conditional operator from those listed in the relational condition listbox 378. Next, the user enters any desired search string in the search string listbox 380. The computer system 100 then interprets the values selected above, and displays a natural language translation of the database commands selected above in the natural language translation listbox 382 in the condition tab window 370. The user can now view a plain-language translation of the selected database command, and make any alterations or changes necessary to ensure that the proper data is retrieved, before actually submitting the SQL request.

Figure 3F:
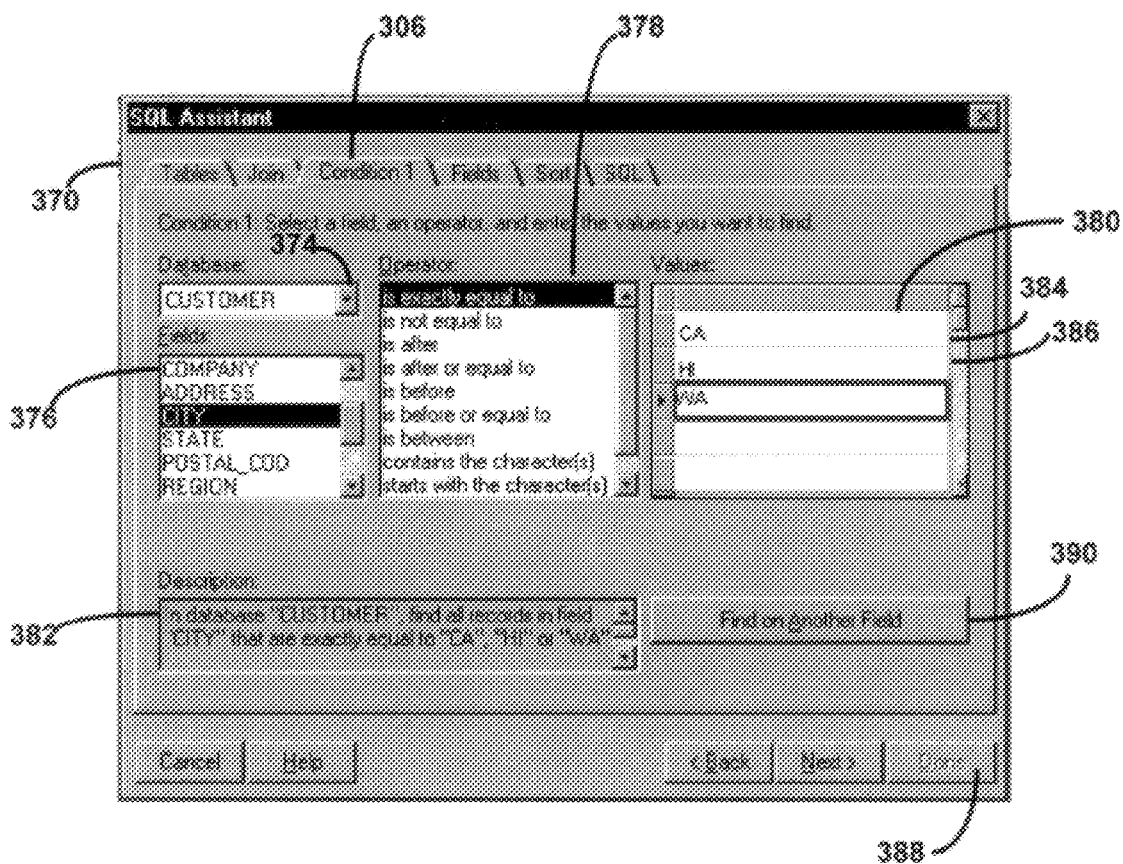

The user can create an "or" condition by (1) entering values in each line in the search string listbox 380, such as entries 384 and 386, as shown in FIG. 3F, or (2) comma separating each item in one line of the search string listbox 380 listbox.

If the user does not require any additional search criteria, the user selects the condition tab window done button 388. If the user requires additional search criteria, the "find on another field" button 390 is selected.

Second Condition Tab Window

Figure 3G:
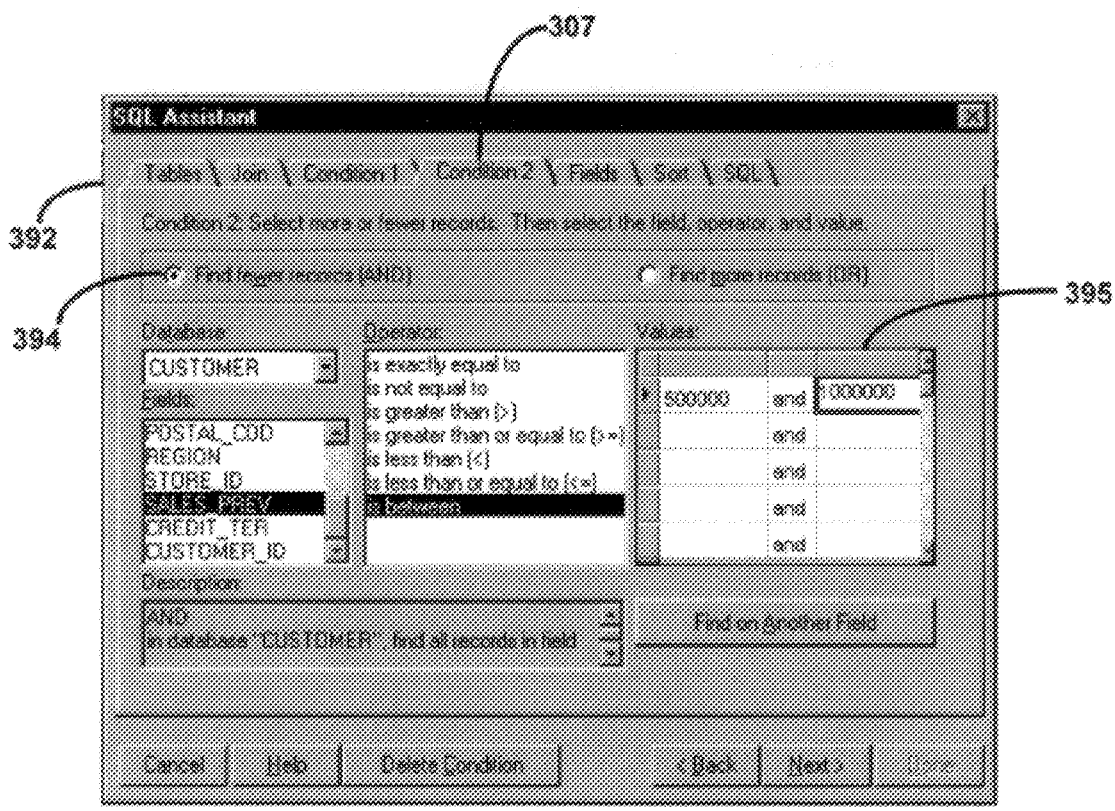

FIG. 3G is an exemplary embodiment of a second condition tab window 392. The second condition tab window is presented on the display 104 in response to the user selecting the "find another field" button 390 in the first condition tab window 370. The second condition tab window 392 differs from the first condition tab window 370 in that there are two radio buttons 394 at the top of the panel, indicating one or more logical condition operators. In the exemplary embodiment shown, these buttons are used to select whether the second condition should widen the search (by applying a logical "or" between conditions), or narrow the search (by applying a logical "and" between conditions.) By default, the "and" logical condition operator is selected. Once the logical condition operator has been selected, the user proceeds to enter the database table, associated database field, relational conditional operator and values in box 395, and search string as before. When completed, the combined search criteria, or database command is interpreted and translated in the natural language translation listbox 382.

Fields Tab Window

Figure 3H:
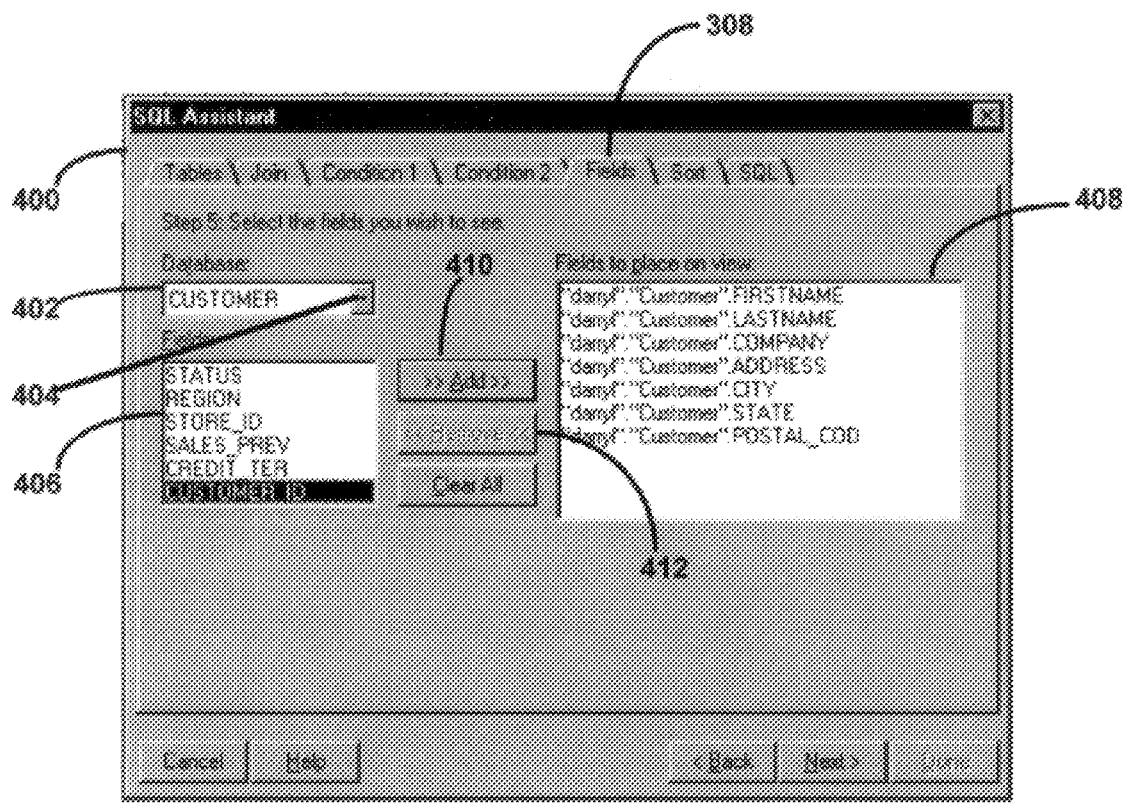

FIG. 3H shows an exemplary embodiment of a fields tab window 400. The fields tab window 400 is used to customize the format for viewing database command results, and is presented on the display 104 when the user selects the fields tab 308. The fields tab window 400 allows the user to select the database fields for viewing after the search is completed. The user selects the database from the field tab window database dropdown listbox 402, which is controlled by the field tab window database dropdown listbox tab 404. The user then selects database fields from the field tab window field listbox 406, and adds these selections to the field tab window selected field listbox 408 by selecting add button 410. Add button 410 is initially disabled, and enabled when the user selects a database field. Selected database fields can also be removed from the field tab window selected field listbox 408 by selecting the remove button 412. The remove button becomes active when fields in the field tab window selected field listbox 408. When each of the desired fields are copied into the field tab window selected field listbox 408, the computer system 100 appends the field name to the database name and displays both on the field tab window selected field listbox 408 separated by a period delimiter.

Sort Tab Window

Figure 3I:
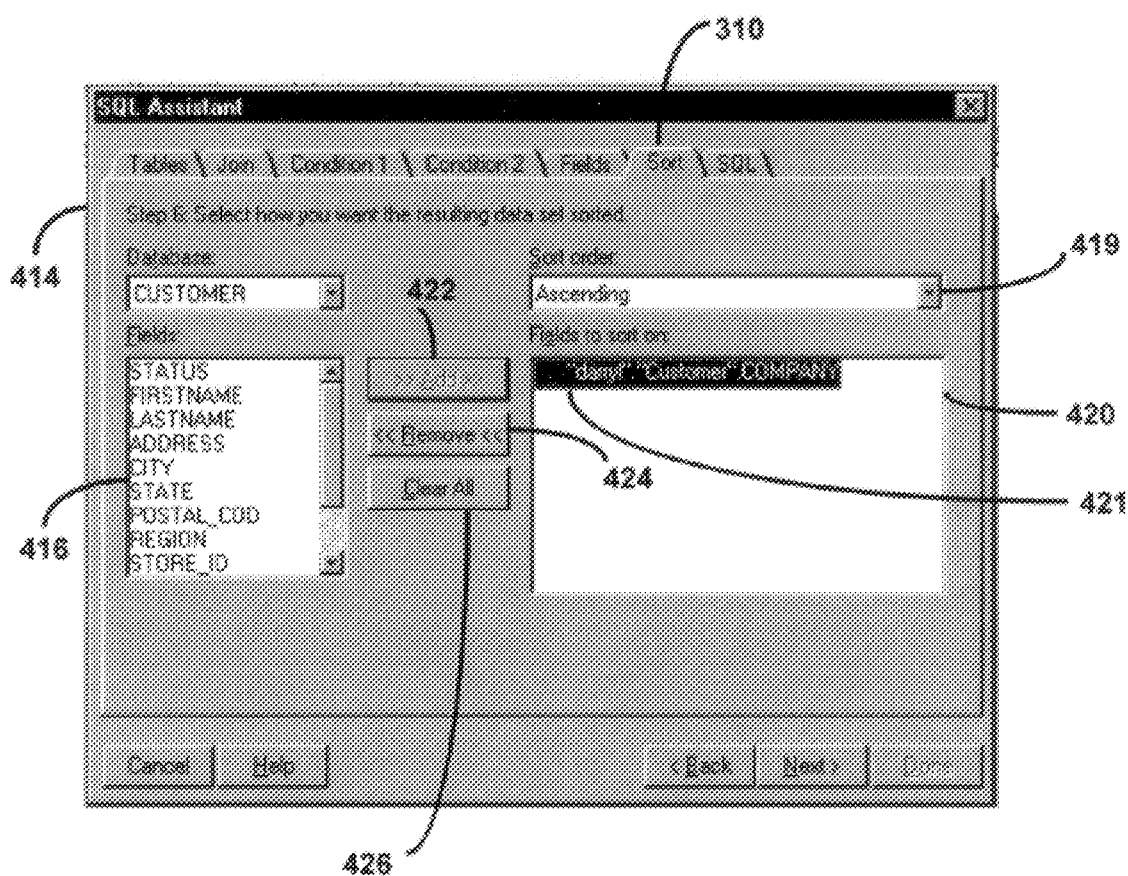
Figure 3J:
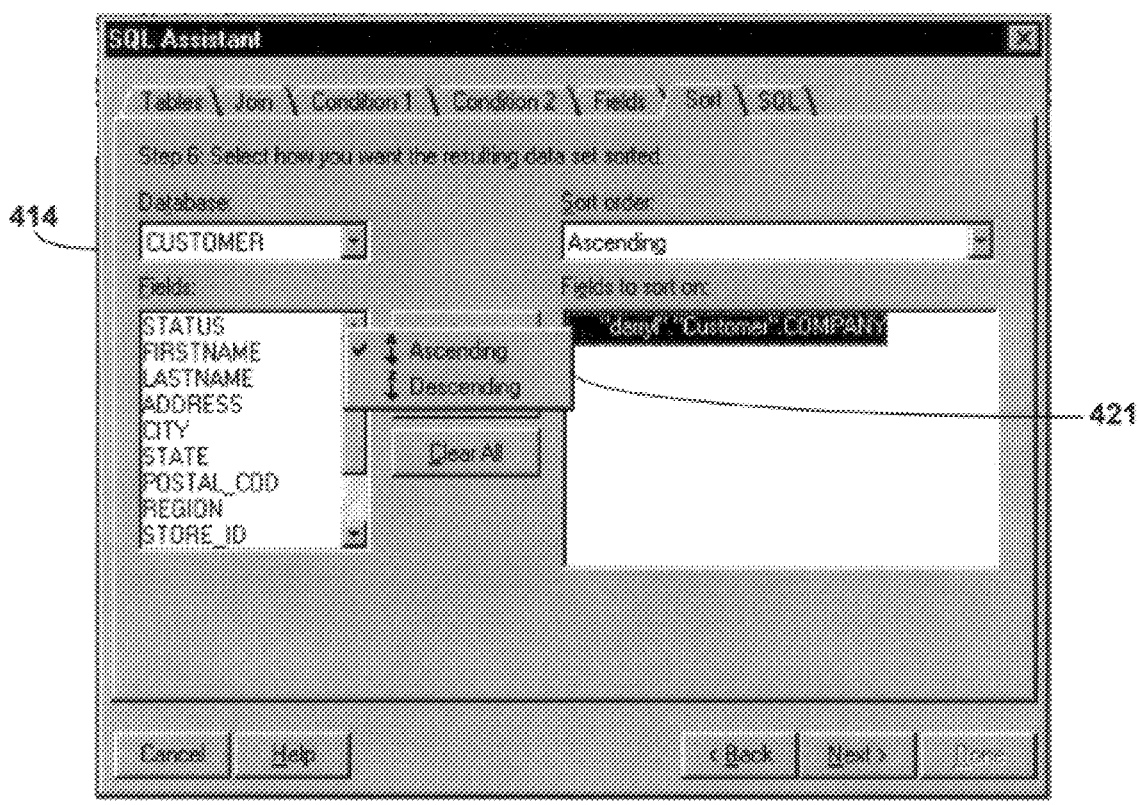

FIG. 3I presents an exemplary embodiment of the sort tab window 414, which is selected by the sort tab 310. The sort tab window 414 allows the user to sort data before viewing it on the display 104. The sort tab window 414 contains a sort tab window database field listbox 416, which lists all of the database fields in the user-selected database tables. Using the mouse device 110, the user can double click on any of these fields or single click on the field and select the sort tab window add button 422 (shown disabled) to move them to the "fields to sort" 420. The user can select sort criteria as "ascending" or "descending" by using the sort order dropdown box 419, or by selecting the indicator icon 421 preceding each field. If the indicator icon 421 is selected, pop-up buttons 421 as shown in FIG. 3J are presented to the user. Likewise, the user can remove fields from the "fields to sort" listbox 420 by double clicking on the selections, or by single clicking on the selections and selecting the sort tab window remove button 424. All fields in the "fields to sort" listbox 424 can be cleared by selecting the sort tab window clear all button 426.

SQL Tab Window

Figure 3K:
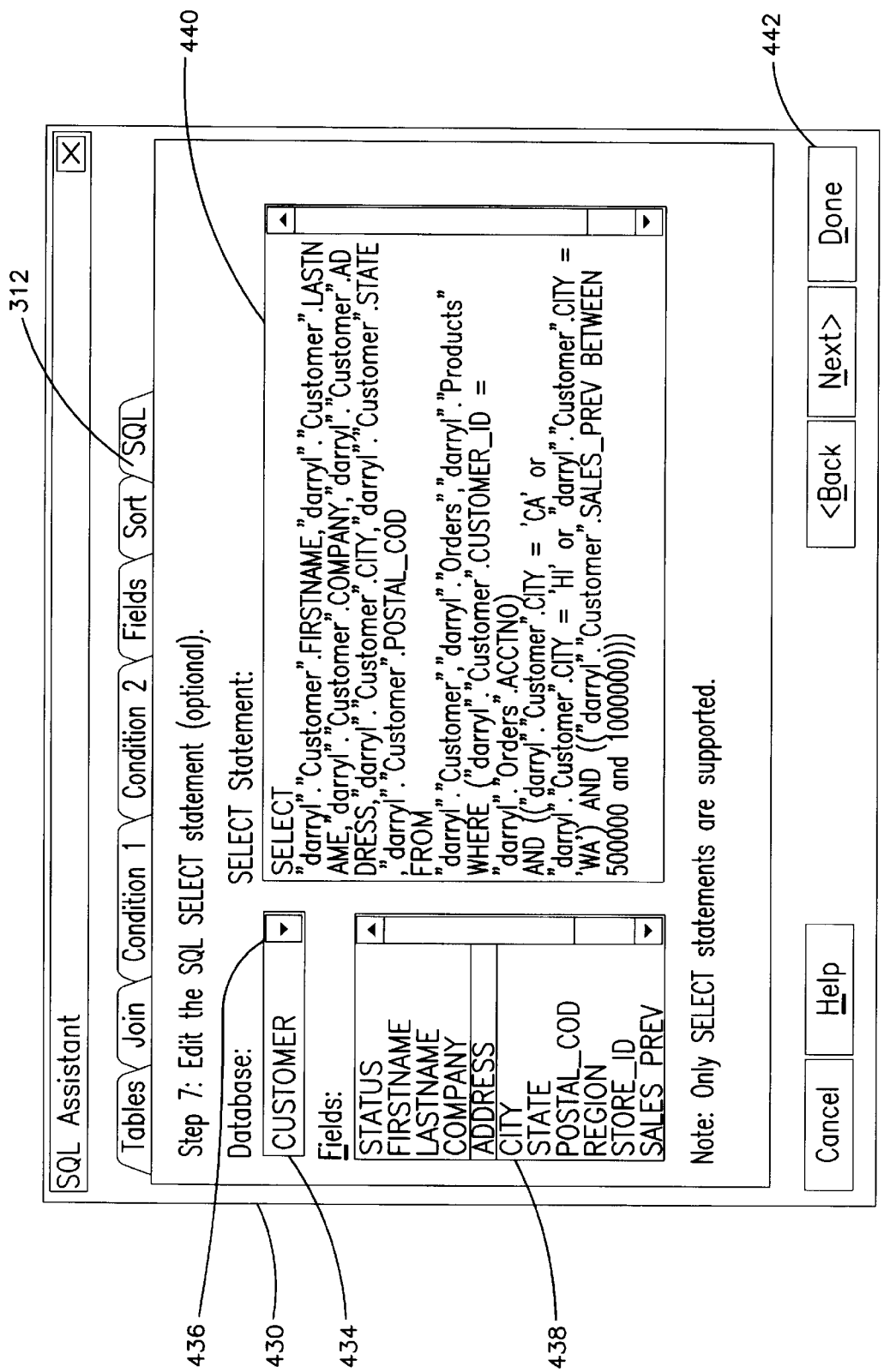

FIG. 3K presents an exemplary embodiment of the SQL tab window. The SQL tab window 430 is presented on the display 104 when the user selects the SQL tab 312.

The SQL tab window 430 comprises an SQL statement edit box 440, in which an SQL statement generated by the foregoing user input is displayed. The SQL statement word wraps within the box automatically. If the SQL statement is too long to view in the SQL statement edit box 440 in its entirety, the statement is word-wrapped and scroll bars are appended to the SQL statement edit box 440.

Each keyword in the SQL statement (such as SELECT, FROM, WHERE, ORDER BY) are placed on a new line to increase readability. Using the mouse device 110, the user can select within this field and highlight information. If the user attempts to modify information in the SQL statement edit box 440, a dialog box appears and warns the user that all tabs except the tables 302 and SQL tabs 312 will become disabled, and other aspects of the user interface described herein will no longer be available for use. The dialog box allows the user to proceed or return. If the user returns, the SQL tab window 430 is again presented on the display 104, with no changes made. If the user proceeds, the SQL statement edit box 440 will become active, and will allow manual SQL statement changes. The user retains the option of returning to the unmodified SQL statement (without the manual changes) by selecting the "restore SQL statement" button 444. This deletes all manual changes to the SQL statement listed in the SQL statement box 440.

The SQL tab window also comprises an SQL tab window database table dropdown listbox 434 and an SQL tab window associated field listbox 438, which allow the user to view the tables and fields and is provided primarily for user reference when making editing changes to the SQL statement edit box 440. If the user selects the SQL tab window database table dropdown listbox tab 434, a list of all database tables that are currently open and available for searching are displayed in the SQL tab window database table dropdown listbox 434. When a database table is selected, the names of the fields associated with the selected database table are displayed in the SQL tab window associated fields listbox 438. When the user selects a field, the database field name will be placed in the SQL statement edit box 440 at the cursor position. Alternatively, the user then may also drag a field name from the SQL tab window associated fields listbox 438 and drop it into the SQL statement edit box 440. When the user is dropping a field name, an extended underscore (_) will appear in the SQL statement editbox 440 allowing the user to select where in the SQL statement edit box 440 the fieldname will be placed. If this is the first item to be changed, the database field name is appended to the SQL statement, and a dialog box appears to warn the user after the modifications have been made, the user must make any further modifications manually.

Figure 3L:
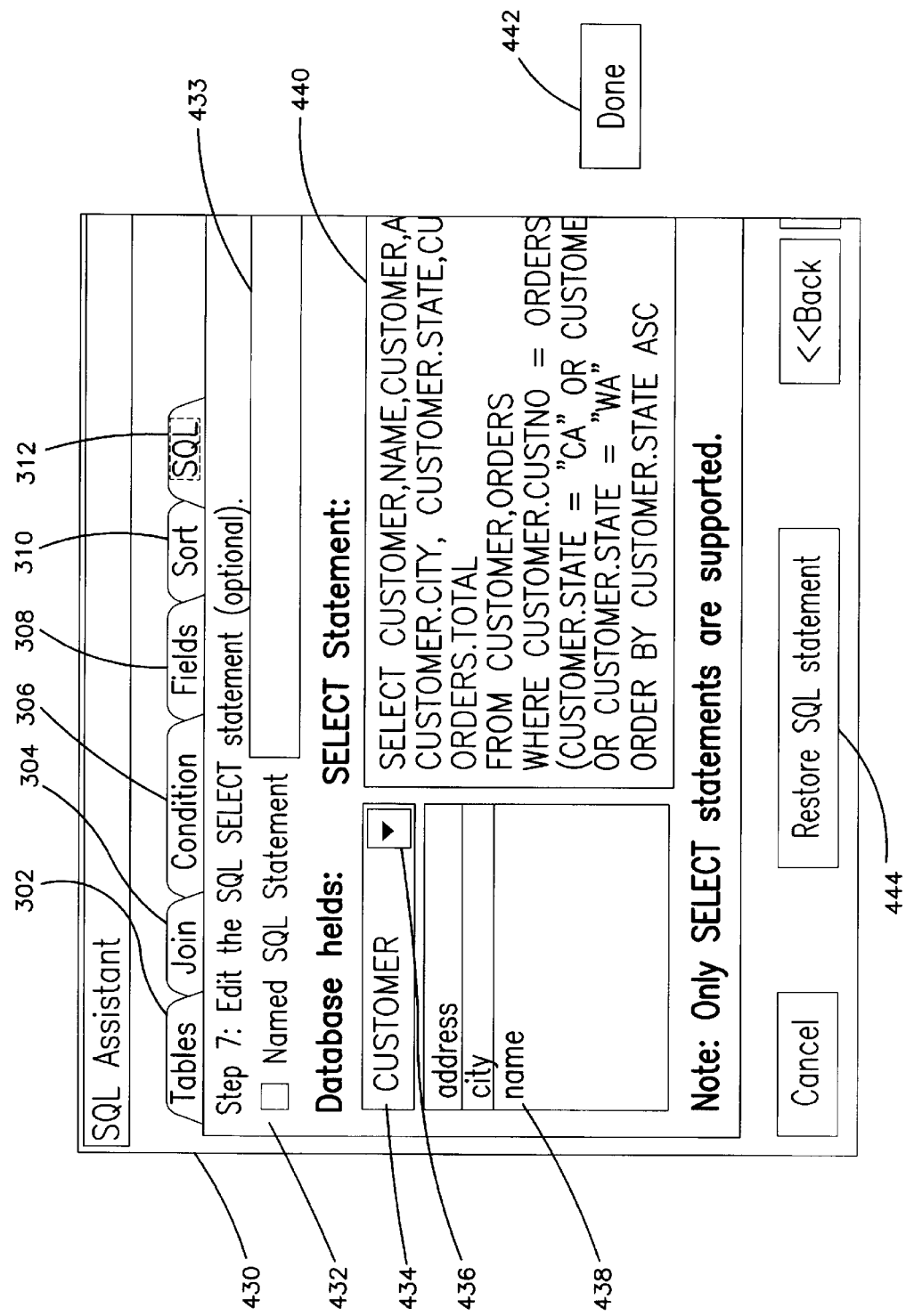

FIG. 3L illustrates an alternative embodiment of the user interface when the SQL tab 312 is selected. This embodiment features a named SQL statement indicator 432 and edit box 440. This allows the user to give a simple, plain-language name for frequently used searches, thereby making the user interface easier to use. For example, the user may wish to name an SQL statement retrieving all customers in California whose orders exceeded $10,000 by naming the SQL statement "GOOD_CAL." Thereafter, using this feature, the user can use the term "GOOD_CAL" in place of the equivalent SQL statement.

The user may also proceed directly to the SQL tab window 430 without entering information in the tab windows selected by tabs 302–312. When this happens, the user can click the SQL statement box 440 and manually enter an SQL SELECT statement. Since no SQL statement was created, no warning dialog box is required in this situation, however, as soon as the user begins entering data into the SQL statement box 440 manually, all tabs except the tables 302 and the SQL tabs 312 are disabled. If the user deletes the entire manually entered SQL SELECT statement, all tabs 302–312 become re-enabled.

After the SQL statement is completely entered, the user selects DONE button 442. At this time, the SQL statement is parsed and sent to the SQL database. If the parser finds an error within the SQL statement, a dialog box indicates as such to the user.

Flow Control

Figure 4A:
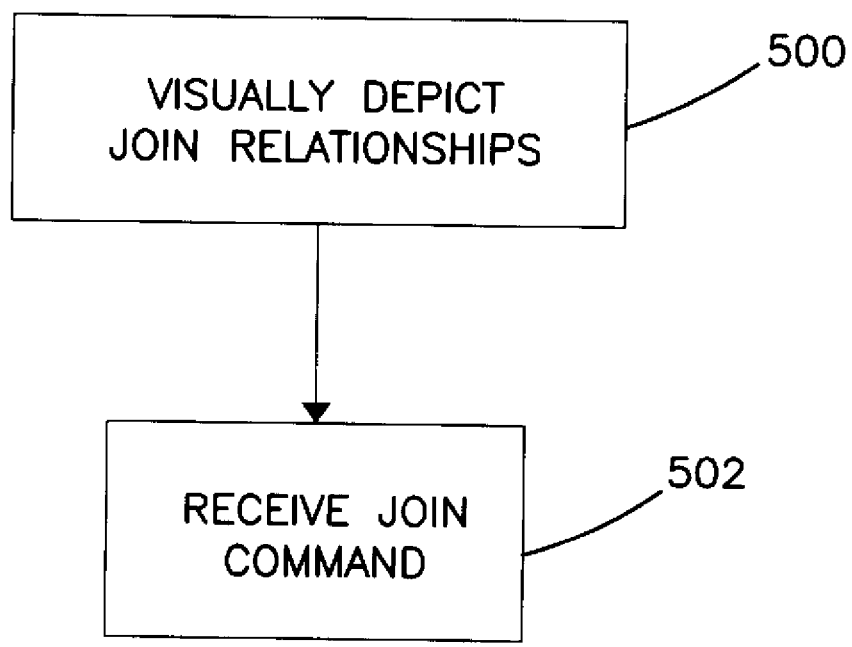
FIGS. 4A and 4B are block diagrams illustrating the logical operation of the present invention.

FIG. 4A is a block diagram illustrating the logical operation of the present invention. Block 500 represents the computer system 100 presenting a window on the display 104, wherein the window visually depicts one or more join relationships. In one embodiment, the window is the relational operations dialog box 360 illustrated in FIG. 3D. Block 502 represents the computer system 100 receiving a join command from the user input device such as the keyboard 108 and mouse device 110. The join command selectively chooses one or more of the visually depicted join relationships presented in the window on the display 104.

Figure 4B:
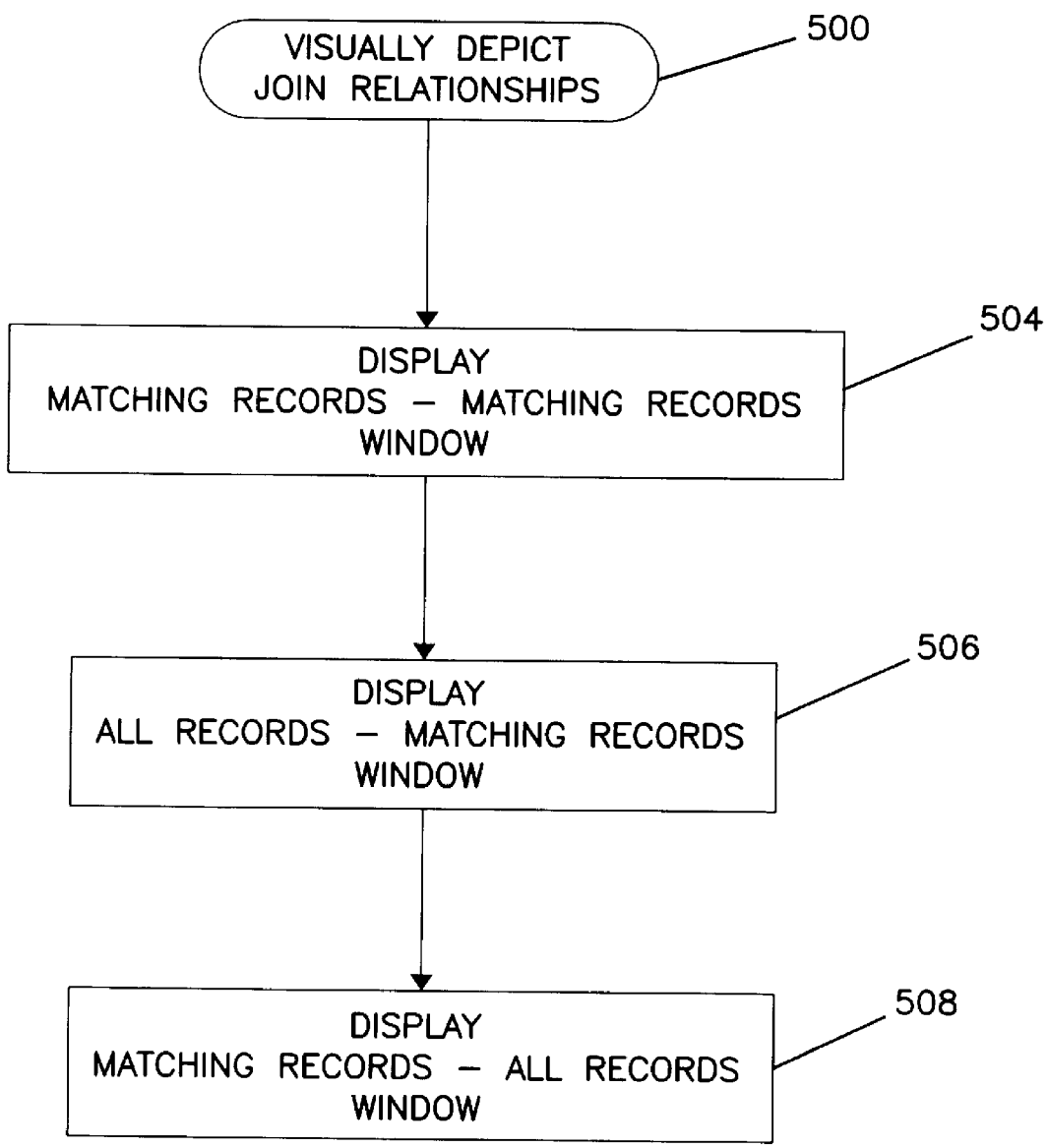

FIG. 4B is a block diagram illustrating the computer 100 presenting a window on the display 104 that visually depicts join relationships, as represented by block 500. Block 504 represents the computer 100 presenting a window displaying matching records in a first table joined to matching records in a second table. Block 506 represents the computer 100 presenting a window displaying all records in a first table joined to matching records in a second table. Block 508 represents the computer 100 presenting a window displaying matching records in a first table joined to all records in a second table.

Conclusion

This concludes the description of the preferred embodiment of the invention. The present invention discloses a method, apparatus, and article of manufacture for visually depicting join relationships in a database management system. The method comprises the steps of visually depicting join relationships on a monitor coupled to a computer and receiving a join command from a user input device into the computer, wherein the join command selectively chooses a visually depicted join relationship.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computerized method for controlling a database management system, comprising the steps of:

visually depicting at least two tables, fields in the tables, and one or more join relationships between fields in the tables on a display device coupled to a computer, wherein the join relationships illustrate join operations performed between two or more tables in the database management system; and accepting a user command from a user input device into the computer, wherein the user command selectively chooses among the join relationships visually depicted on the display device.

2. A computerized method for controlling a database management system, comprising the steps of:

visually depicting one or more join relationships on a display device coupled to a computer, wherein the join relationships illustrate join operations performed between two or more tables in the database management system;

accepting a user command from a user input device into the computer, wherein the user command selectively chooses among the join relationships visually depicted on the display device; and performing one or more of the join operations between two or more of the tables in the database management system in response to the accepted user command.

3. The method of claim 2, wherein the visually depicted join relationships are selected from a group comprising a visually depicted inner join relationship, a visually depicted left outer join relationship, and a visually depicted right outer join relationship.

4. The method of claim 3, wherein the visually depicted inner join relationship comprises a window displaying only matching records in a first table joined to only matching records in a second table.

5. The method of claim 3, wherein the visually depicted left outer join relationship comprises a window displaying all records in a first table joined to only matching records in a second table.

6. The method of claim 2, wherein the visually depicted right outer join relationship comprises a window displaying only matching records in a first table joined to all records in a second table.

7. The method of claim 2, wherein the join operations are selected from a group comprising an inner join, a left outer join, and a right outer join.

8. A computerized apparatus for controlling a database management system, comprising:

a computer;

means, performed by the computer, for visually depicting at least two tables, fields in the tables, and one or more join relationships between fields in the tables on a display device coupled to a computer, wherein the join relationships illustrate join operations performed between two or more tables in the database management system; and means, performed by the computer, for accepting a user command from a user input device into the computer, wherein the user command selectively chooses among the join relationships visually depicted on the display device.

9. A computerized apparatus for controlling a database management system, comprising:

a computer;

means, performed by the computer, for visually depicting one or more join relationships on a display device coupled to a computer, wherein the join relationships illustrate join operations performed between two or more tables in the database management system;

means, performed by the computer, for accepting a user command from a user input device into the computer, wherein the user command selectively chooses among the join relationships visually depicted on the display device; and means for performing one or more of the join operations between two or more of the tables in the database management system in response to the accepted user command.

10. The apparatus of claim 9, wherein the visually depicted join relationships are selected from a group comprising a visually depicted inner join relationship, a visually depicted left outer join relationship, and a visually depicted right outer join relationship.

11. The apparatus of claim 10, wherein the visually depicted inner join relationship comprises a window displaying only matching records in a first table joined to only matching records in a second table.

12. The apparatus of claim 10, wherein the visually depicted left outer join relationship comprises a window displaying all records in a first table joined to only matching records in a second table.

13. The apparatus of claim 10, wherein the visually depicted right outer join relationship comprises a window displaying only matching records in a first table joined to all records in a second table.

14. The apparatus of claim 9, wherein the join operations are selected from a group comprising an inner join, a left outer join, and a right outer join.

15. A program storage device, readable by a computer, tangibly embodying one or more programs of instructions executable by the computer to perform method steps for controlling a database management system, the method comprising the steps of:

visually depicting at least two tables, fields in the tables, and one or more join relationships between fields in the tables on a display device coupled to the computer, wherein the join relationships illustrate join operations performed between two or more tables in the database management system; and accepting a user command from a user input device into the computer, wherein the user command selectively chooses among the join relationships visually depicted on the display device.

16. A program storage device, readable by a computer, tangibly embodying one or more programs of instructions executable by the computer to perform method steps for controlling a database management system, the method comprising the steps of:

visually depicting one or more join relationships on a display device coupled to the computer, wherein the join relationships illustrate join operations performed between two or more tables in the database management system;

accepting a user command from a user input device into the computer, wherein the user command selectively chooses among the join relationships visually depicted on the display device; and performing one or more of the join operations between two or more of the tables in the database management system in response to the accepted user command.

17. The program storage device of claim 16, wherein the visually depicted join relationships are selected from a group comprising a visually depicted inner join relationship, a visually depicted left outer join relationship, and a visually depicted right outer join relationship.

18. The program storage device of claim 17, wherein the visually depicted inner join relationship comprises a window displaying only matching records in a first table joined to only matching records in a second table.

19. The program storage device of claim 17, wherein the visually depicted left outer join relationship comprises a window displaying all records in a first table joined to only matching records in a second table.

20. The program storage device of claim 17, wherein the visually depicted right outer join relationship comprises a window displaying only matching records in a first table joined to all records in a second table.

21. The program storage device of claim 16, wherein the join operations are selected from a group comprising an inner join, a left outer join, and a right outer join.

* * * * *